United States Patent
Alvarez-Escurra et al.

[19]

[11] Patent Number: 5,923,903
[45] Date of Patent: Jul. 13, 1999

[54] PROGRAMMABLE LOGIC CONTROLLER INPUTS-OUTPUTS SYSTEM

[75] Inventors: Jorge Alvarez-Escurra, Antibes; Henry Baraston, Nice; François Beck, Chateauneuf de Grasse; Marie-Christine Perotto, Roquefort les Pins, all of France

[73] Assignee: Schneider Automation, Valbonne, France

[21] Appl. No.: 08/758,376

[22] Filed: Nov. 29, 1996

[30] Foreign Application Priority Data

Nov. 30, 1995 [FR] France .................................. 95 15022

[51] Int. Cl.$^6$ ...................................................... G06F 13/00
[52] U.S. Cl. ............................................ 395/882; 395/854
[58] Field of Search ........................... 395/825, 828–834, 395/854, 882, 884, 892, 893, 894; 370/431, 464; 375/377

[56] References Cited

U.S. PATENT DOCUMENTS

| | | | |
|---|---|---|---|
| 4,060,849 | 11/1977 | Bienvenu et al. ...................... | 364/200 |
| 4,542,498 | 9/1985 | Bodros et al. ............................. | 370/60 |
| 4,550,407 | 10/1985 | Couasnon et al. ....................... | 371/29 |
| 4,949,299 | 8/1990 | Pickett . | |
| 5,408,506 | 4/1995 | Mincher et al. ......................... | 375/356 |
| 5,416,908 | 5/1995 | DiCarlo et al. . | |
| 5,490,134 | 2/1996 | Fernandes et al. ........................ | 370/79 |
| 5,546,396 | 8/1996 | Clauzel et al. .......................... | 370/85.1 |
| 5,574,944 | 11/1996 | Stager et al. ............................ | 395/825 |

FOREIGN PATENT DOCUMENTS 0 718 727 A2   6/1996   European Pat. Off. .

*Primary Examiner*—Ayaz R. Sheikh
*Assistant Examiner*—Xuan M. Thai
*Attorney, Agent, or Firm*—Oblon, Spivak, McClelland, Maier & Neustadt, P.C.

[57] ABSTRACT

This invention relates to a programmable logic controller inputs-outputs system comprising a processing unit (CPU) provided with a memory (M1, M2, M3) and at least one inputs-outputs coupler (C1 or C2 or C3 or C4) provided with a coupler memory (Mc) and forming the link between sensors and pre-actuators and the processing unit (CPU) characterized in that exchanges between the processing unit memory and each coupler memory are structured by logical channels carrying out a job function and grouping all or some physical channels of a coupler and in that the memory (M2) of the processing unit (CPU) contains objects related to each logical channel that form a data structure with standardized contents, these objects being exchanged with the coupler memory (Mc) through a user program by means of an instruction set.

8 Claims, 6 Drawing Sheets

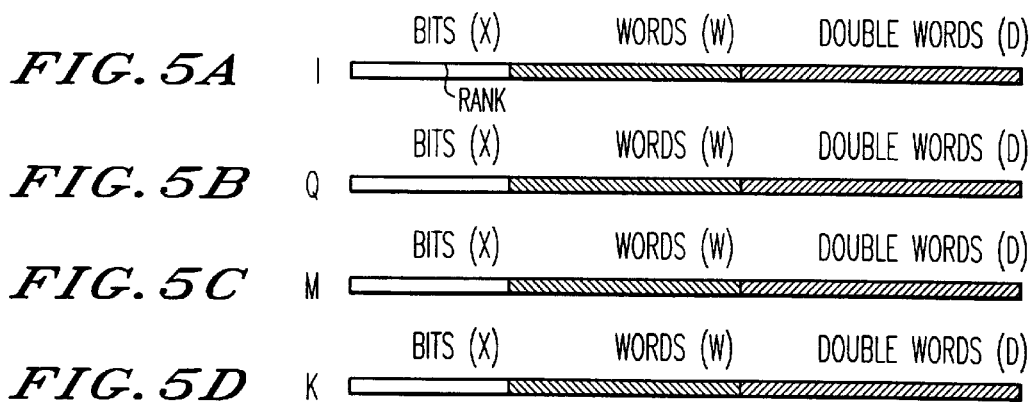
FIG. 5A
FIG. 5B
FIG. 5C
FIG. 5D
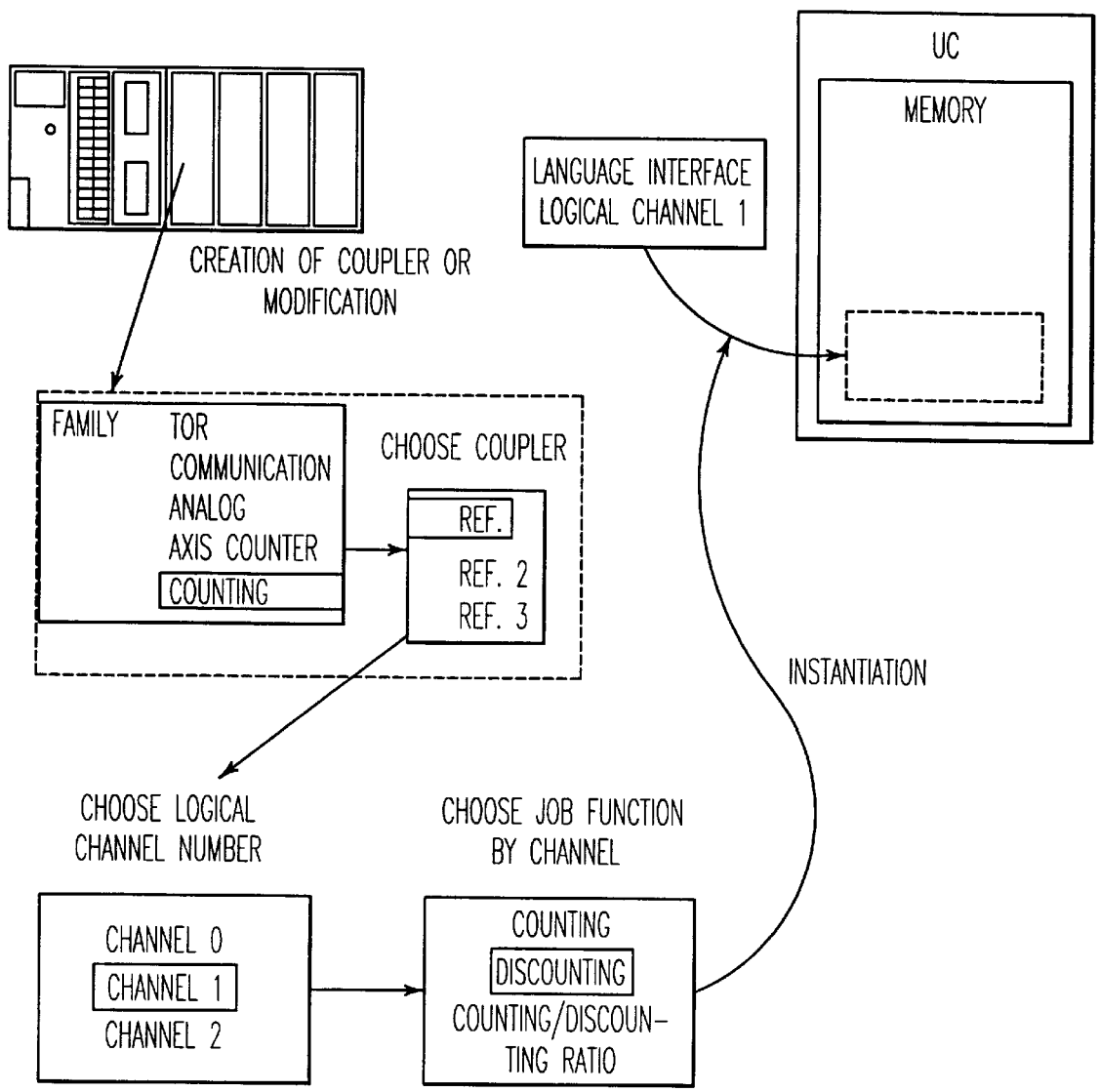
FIG. 6

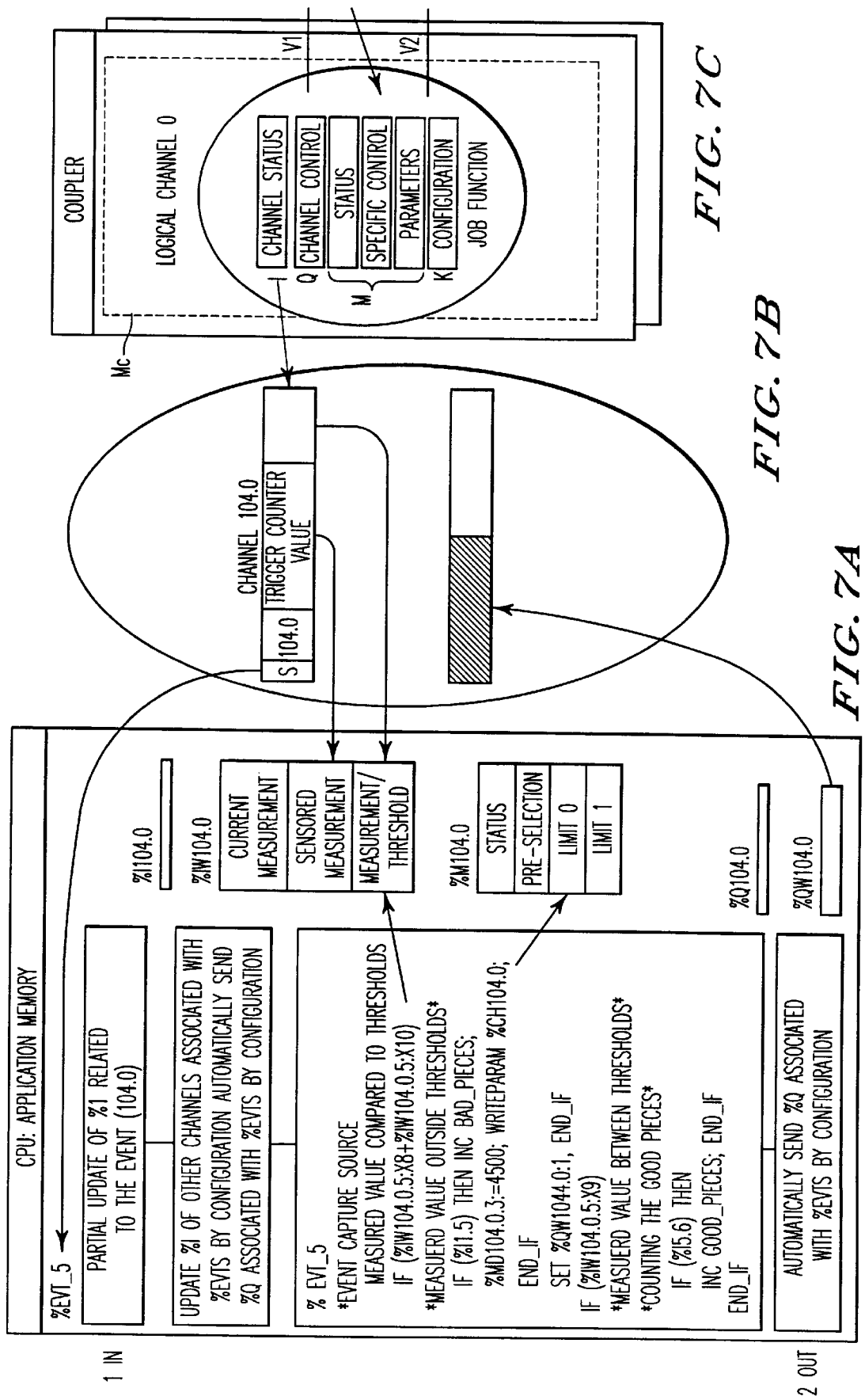

PROGRAMMABLE LOGIC CONTROLLER INPUTS-OUTPUTS SYSTEM

BACKGROUND OF THE INVENTION

1. Field of the Invention

This invention relates to a programmable logic controller input/output system.

2. Discussion of the Background

Normally, referring to FIG. 1, a programmable logic controller comprises a processing unit referred to as the CPU and inputs/outputs couplers or interfaces C1, C2, C3, C4 which provide the link between the processing unit CPU and the operations part (sensors, pre-actuators, etc.).

The processing unit CPU comprises processor(s) P, a ROM memory M1 containing the manufacturer's program, a RAM memory M2, an inputs/outputs manager I that communicates with them through a bus. Optionally, couplers such as C4 are integrated in the internal structure of the processing unit. A RAM memory M2 contains the user program in a first area, and data in a second area, particularly images of the states of couplers and constants related to the user program. The user program is written in a specific graphic language such as the LADDER language type (contacts language) or the GRAFCET language type.

Programmable logic controllers to be used to process a large number of inputs-outputs have a modular structure based on one or several "racks" which contain couplers and are connected to each other. The main rack marked R contains the module(s) of processing units CPU.

The inputs-outputs manager I comprises an interface bus IP that provides the link through the inputs-outputs bus with the main rack R couplers C1, C2, or with secondary "rack" R1 couplers connected to the main rack, and also with couplers included in the CPU such as coupler C4. A bus interface IS provides the link with remote couplers such as coupler C3, through a factory bus B.

The programmable logic controller comprising the central processing unit CPU receives electrical signals from sensors through couplers and transmits electrical signals to other couplers. Therefore each coupler controls the operations part under the control of the processing unit CPU. This processing unit continuously executes the user program as a function of the state of its inputs to control the states of the outputs.

Each coupler such as C1, C2, C3, C4 is connected through physical input or output channels 1, 2 etc., to the operations part (sensors, actuators, etc.).

There are several categories of sensors, including simple couplers and intelligent couplers.

Simple couplers transmit information to the processing unit (or receive information from it) without any complementary processing. This is the case for On/Off couplers.

Intelligent couplers carry out processing (filtering, scaling) of signals that they receive or transmit and/or processing of information received from sensors or information sent to the pre-actuator before sending it to the processing unit. For example, the analog value output by a temperature sensor must firstly be digitized and then made linear as a function of calculations taking account of the sensor type. The processing is called job function. Couplers have their own microprocessors and internal software to carry out this processing so that it can be done independently from the processing unit CPU. These intelligent couplers are adapted to one job among communication, analog processing, axis positioning or control, counting, regulation or special treatment (electronic cam, weighing, etc.).

At the present time, coupler operating parameters are controlled by mechanical means (potentiometers, jumpers) or by software means. The user responsible for configuration must change methods when using different couplers.

SUMMARY OF THE INVENTION

The purpose of the invention is to make it easy for the user to program or configure couplers, independently of the topology of the logic controller (regardless of whether it is in the form of a single rack or remote rack(s)). All job functions are managed with a common syntax and instructions.

The programmable logic controller inputs-outputs system according to the invention comprises a processing unit provided with a memory and at least one inputs-outputs coupler provided with the coupler memory and forming the link between sensors and pre-actuators and the processing unit, characterized in that exchanges between the processing unit memory and the memory in each coupler are structured through logical channels carrying out a job function and containing all or some physical channels of a coupler and that the processing unit memory contains objects related to each logical channel that make up a data structure for which the contents are standardized, these objects being exchanged with the coupler memory by the user program using an instruction set.

According to one characteristic, the data structure is structured by exchange type stored in memory areas containing information produced periodically, information communicated periodically, information processed non-periodically by the user program, and information defined by the user to start the job function, respectively.

According to another characteristic, the various memory areas are structured in memory sub-areas called object types containing bits, words, double words that contain information of the same type, each element being identified by a rank.

According to one characteristic, the memory of the processing unit contains a data structure associated with each coupler.

According to one characteristic, the syntax accessing information about the data structure is formed by the exchange type, the object type, the topological address composed of the coupler address associated with the logical channel number and the rank.

According to one characteristic, a logical channel may activate an event controlled processing.

According to one characteristic, the system comprises an instantiation mechanism that reserves the memory space necessary for the language interface of a logical channel.

BRIEF DESCRIPTION OF THE DRAWINGS

Other characteristics and advantages of the invention will become clear in reading the following description given as an example of an embodiment method and referring to the drawings, in which:

FIG. 5 shows a diagram of the data structure;

FIG. 6 is a diagram explaining the instantiation mechanism; and

FIG. 7 is an event operations diagram.

DESCRIPTION OF THE PREFERRED EMBODIMENTS

Figure 1:
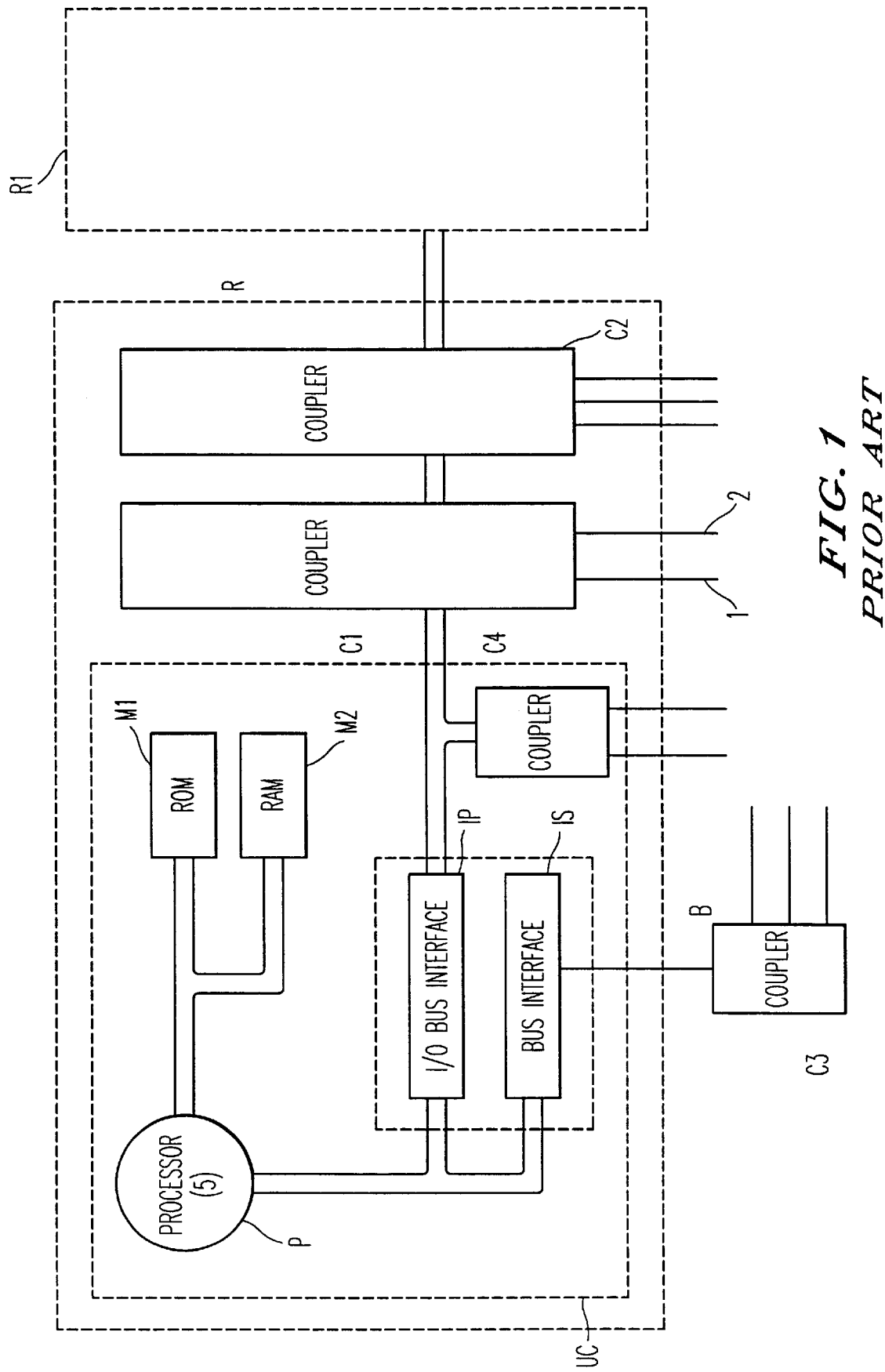
FIG. 1 is a functional block diagram of a programmable logic controller illustrating the state of the art.

The programmable logic controller together with the inputs-outputs system according to the invention is a logic controller having a basic structure of the type shown in FIG. 1. Each coupler including On/Off couplers has a coupler memory Mc.

The dialogue between each coupler C1, C2, etc. and the processing unit CPU is structured by logical channels that are characterized firstly by one or several "job" functions. For example for the "counting" job, a logical channel may carry out one or several of the following "job" functions: counting, discounting, counting/discounting, frequency meter, position measurement. Secondly, the logical channel is characterized by the physical channels that it uses. For example in the case of a counting coupler with four counters, a logical channel contains physical interface channels for counting sensors such as proximity detectors or optical position encoders and physical channels for inputs from services such as validation of counting or counter pre-selection.

The user program is broken down into tasks. A task is a set of instructions periodically executed by the processing unit processor P. The manufacturer's program activates the inputs-outputs manager I before executing a task in order to acquire information originating from a logical channel. At the end of the task, the manufacturer's program activates the inputs-outputs manager (mark I on the FIG. 1) to make it send information to the logical channel.

Figure 2B:
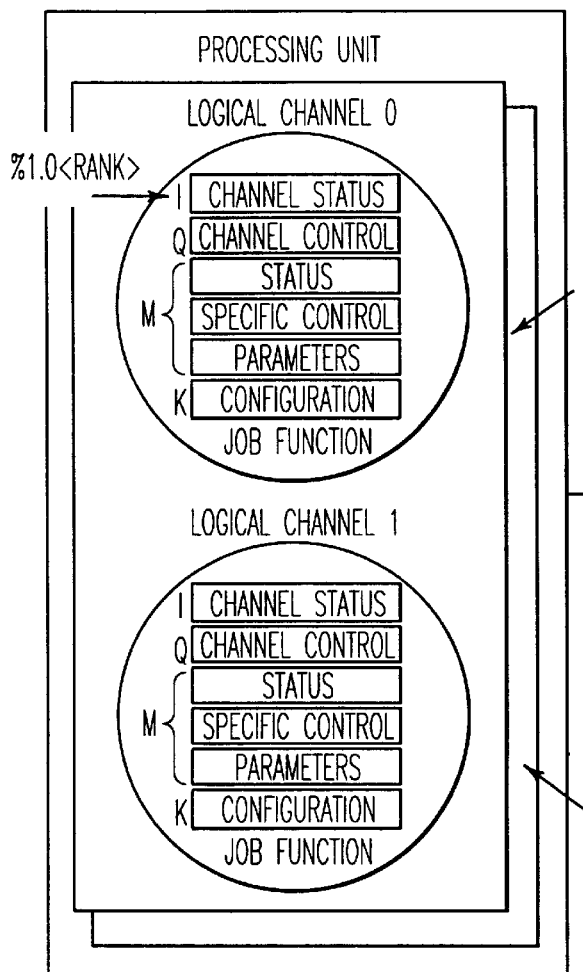
FIG. 2 is a diagram illustrating the communication structure between the processing unit and the coupler in the logic controller according to the invention.
Figure 2C:
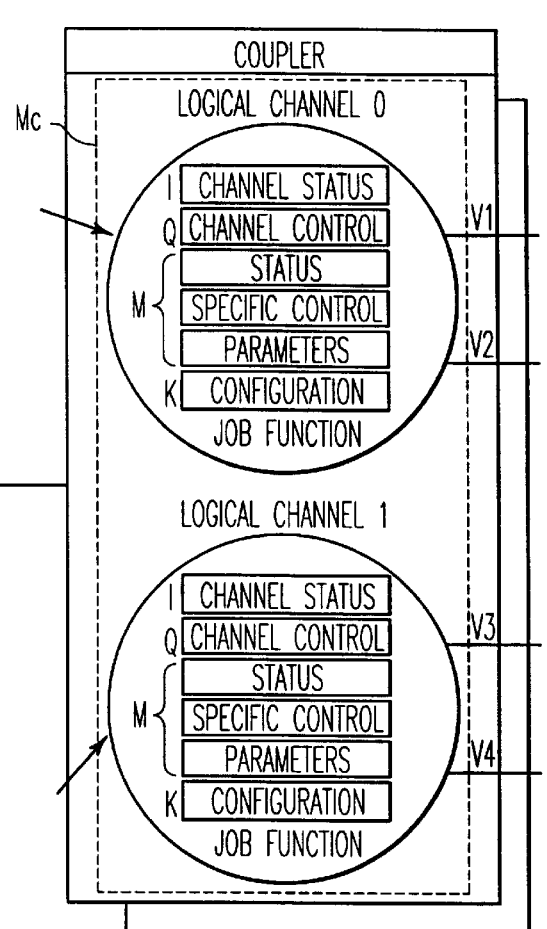
Figure 2A:
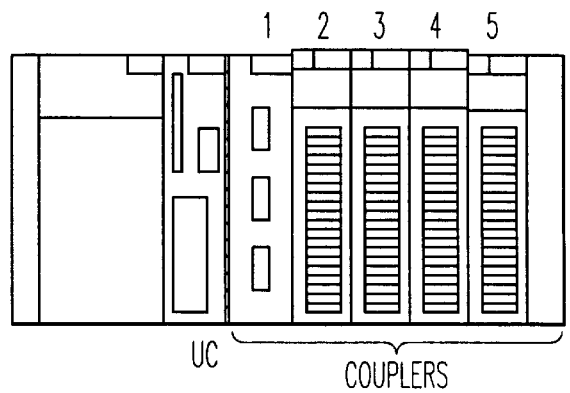

A data structure is associated with each logical channel of a given coupler (see FIGS. 2 to 4), that we will call language interface. This data structure is invariable regardless of the coupler and regardless of the logical channel. Its size and contents depend on the job function to be carried out. It is stored in a coupler memory Mc, the contents of this memory being swapped (received or sent) on or to an identical memory area in the processing unit memory M2.

The data structure is structured by exchange type (see FIG. 3):

Periodic input exchange: the contents are sent from memory Mc to memory M2. It generally contains information produced periodically, for example the numeric value of a sensor.

Periodic output exchange: the contents are received from memory M2. It generally contains information communicated periodically by the user program.

Exchange at the request of the user program: this area has parts with contents which are received from memory M2, and parts with contents which are sent to memory M2. It contains information processed "non-periodically" by the user program.

Configuration exchange when the user program is started; this area is received from memory M2. It contains information defined by the user to start the job function.

Areas are coded I, Q, M, K respectively.

The user program accesses information stored in the memory M2 of the processing unit CPU in the form of the data structure using the syntax described above.

If a logical channel, for example 0 or 1 is considered, area I contains information that is generated by this logical channel.

Area Q contains orders or commands of the processing unit that are to be sent to the logical channel.

Area M depends on the job function and may contain "status" type information, specific command parameters, and setting parameters. This information is exchanged at the request of the user program.

The status parameters contain channel faults and possibly the operating state of the logical channel.

Specific command parameters are commands which are different from the Q area, only in that they are sent at the request of the user program, for example an order to move to a given position at a given speed.

Setting parameters are information sent to the logical channel to describe the variable characteristics of the operations part. For example, one of the parameters for an axis control coupler is the gain of the process position.

Area K contains configuration parameters, in other words parameters of sensors or actuators working with the coupler. These are constants for a given operations part.

Referring to FIG. 5, the various areas I, Q, M and K are also structured into memory sub-areas called object types. These sub-areas are as follows:

"Bits" sub-area coded X or default sub-area (if nothing is specified for the object type): the information stored is binary, for example start counting;

the "Words" sub-area coded W: the information stored is of the numeric type coded on 16 bits, for example the numeric value of a temperature sensor.

The "Double words" sub-area coded D: the information stored is of the numeric type coded on 32 bits, for example the numeric value of a temperature sensor.

Each sub-area contains several items of information or elements of the same type. A given element is identified by its "rank", the value of which is equal to the position of the element relative to the beginning of the sub-area. Therefore each information element is defined by an object type and a rank inside each area.

The language interface syntax is in the following form:

%<exchange type code><object type code><topological address><rank>.

The rank identifies the position of the element measured from the beginning of the sub-area. Therefore each information element is defined by an object type and a rank inside each area.

The topological address is defined by the coupler address associated with the logical channel number.

Couplers such as C1 and C2 installed in the main rack R are accessed by an address equal to the coupler number defined on 1 or 2 digits. For example the address 1.0 is the logical channel 0 of the coupler located in slot 1 in the main rack R. %ID 1.0 will then be the value of the logical counting channel 0 on the counting coupler located in slot 1 in the main rack R.

Figures 3A, 3B:
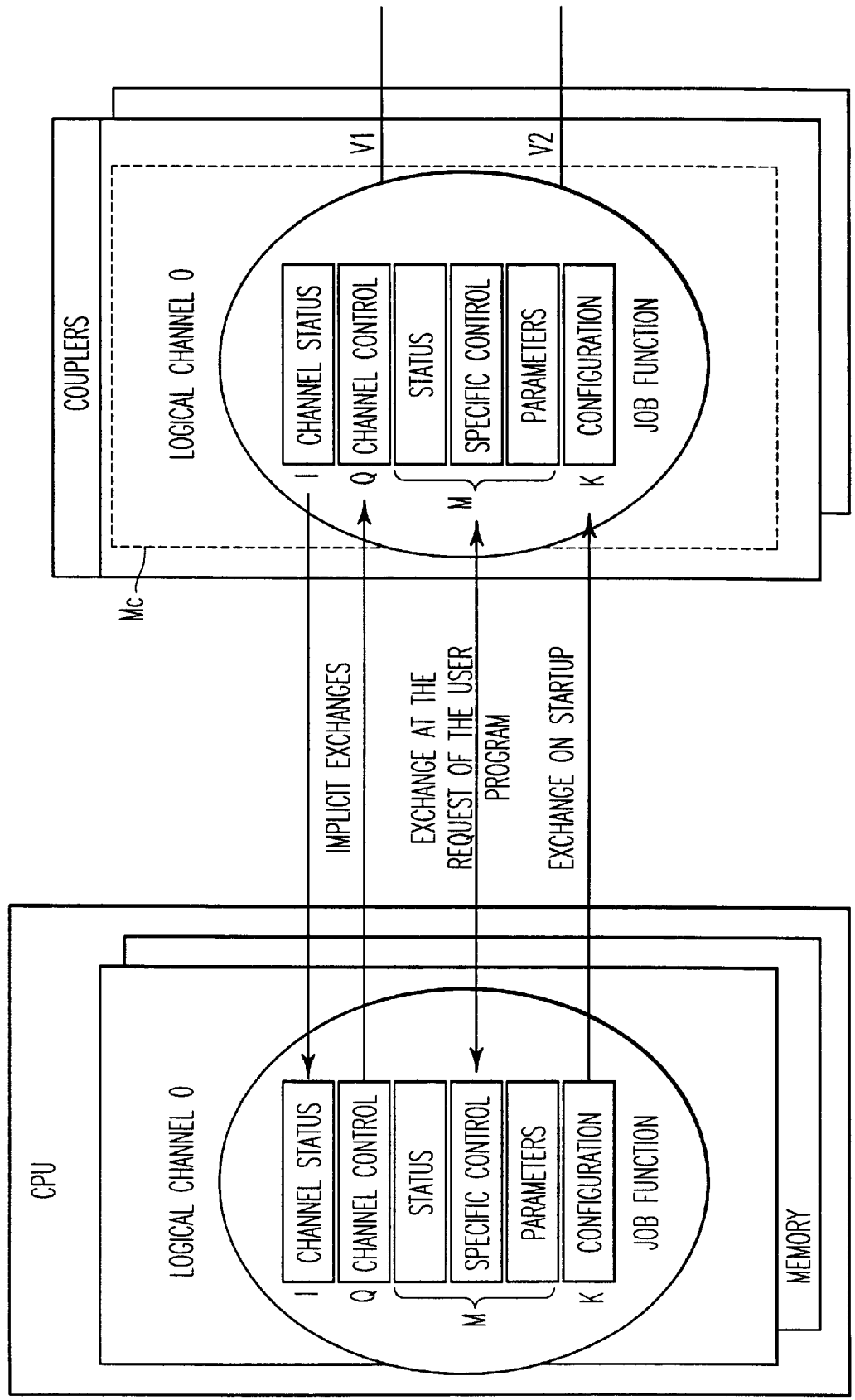
FIG. 3 is a diagram showing exchanges between the processing unit memory and a coupler memory.
Figure 4B:
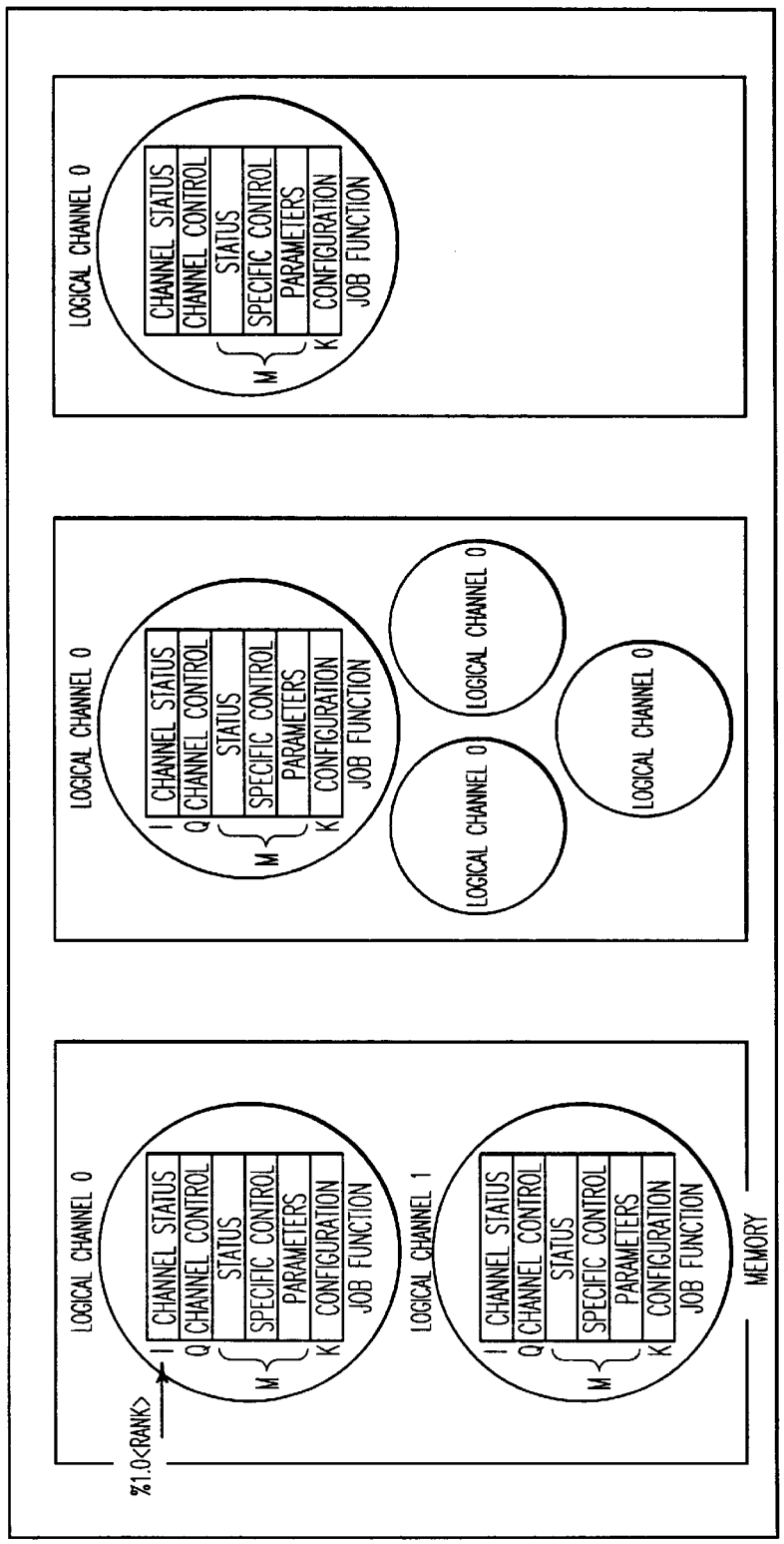
FIG. 4 is a diagram showing data structures associated with each logical channel.
Figure 4A:
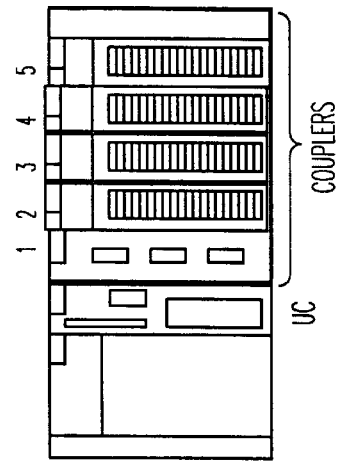

Now referring to FIG. 3, exchanges concerning I, M and K are implicitly handled by the manufacturer's program. A set of user program instructions manages exchanges in the M area between the processing unit and logical channels. M setting parameters are accessible in read/write in the processing unit memory by the user program.

A data structure may be associated with each coupler. It is called a coupler language interface and has the same structure and the semantic as the interface associated with the channel. Its size and contents depend on the coupler type. The language interface syntax associated with the coupler is:

<exchange type code><@coupler><MOD><rank>.

The logical channel may also send information to the processing unit in addition to the various exchange types defined above. This exchange type is called an event controlled exchange. For example in a logical counting channel, exceeding a limit may cause the value of the current measurement (counter value) to be transmitted to the processing unit.

When an event controlled exchange takes place, the logical channel sends information to the processing unit CPU to update all or part of area I. When an event is received, the manufacturer's program activates part of the manufacturer's program associated with this event. Thus referring to FIG. 7, it is seen that a "capture order" event generated by the logical channel triggers processing that forms part of the manufacturer's program. This processing is denoted %EVT5.

Event controlled processing enables the user to associate a program sequence with each event sent by a logical channel of a coupler to the processing unit.

Command events take priority and may interrupt any periodic task.

The configuration of the coupler will now be described, with reference to FIG. 6.

It is firstly necessary to choose the coupler family (On/Off, communication, analog, axis positioning or control, counting), and then to choose a coupler reference (reference 1, 2, 3, etc.), belonging to this job.

When the coupler has been chosen, a logical channel can then be configured by making it support a number of job functions. For example if a logical counting channel is chosen, the job function will be configured by choosing one or several of the following job functions: counting function, discounting function, counting/discounting function, frequency meter function. The system reserves the processing unit memory area which will be used by the language interface, when associating the job function. The operation is called "instantiation".

When the job function has been chosen, the values in area K and area M can then be defined using the software screens.

Obviously, it is possible to imagine alternatives and improvements to details, and even to use equivalent means, without departing from the scope of the invention.

We claim:

1. A programmable logic controller input/output system comprising:
   a processor having
      a processor memory including a read only memory and a random access memory and
      at least one input/output coupler, each one of the at least one input/output coupler having a coupler memory and providing a link between the processor and at least one of a sensor and a pre-actuator;
   at least one logical channel for grouping a plurality of physical channels of one of the at least one input/output coupler, one of the at least one logical channel having at least one of
      a means for performing a sensor job function and
      a means for performing a pre-actuator job function;
   a plurality of objects stored in the random access memory, each one of the plurality of objects related to one of the at least one logical channel and forming a data structure having standardized contents; and
   a user program using an instruction set for exchanging the plurality of objects with contents of the coupler memory.

2. An input/output system according to claim 1, wherein the data structure is structured by exchange type stored in
   a first memory area having information produced periodically,
   a second memory area having information communicated periodically,
   a third memory area having information processed non-periodically by the user program, and a fourth memory area having information defined by a user to start the job function.

3. An input/output system according to claim 2, wherein each one of the first memory area, the second memory area, the third memory area, and the fourth memory area has a plurality of memory sub-areas having bits, words, and double words corresponding to information of type bit, word, and double word, respectively, wherein an element of each one of the plurality of memory sub-areas is defined by a rank.

4. A programmable logic controller input/output system comprising:
   a processor having
      a processor memory including a read only memory and a random access memory and
      at least one input/output coupler, each one of the at least one input/output coupler having a coupler memory and providing a link between the processing unit and at least one of a sensor and a pre-actuator;
   at least one logical channel for carrying out a job function and for grouping at least one physical channel of one of the at least one input/output coupler,
   a plurality of objects stored in the random access memory, each one of the plurality of objects related to one of the at least one logical channel and forming a data structure having standardized contents structured by exchange type stored in
      a first memory area having information produced periodically,
      a second memory area having information communicated periodically,
      a third memory area having information processed non-periodically by the user program, and
      a fourth memory area having information defined by a user to start the job function,
   each one of the first memory area, the second memory area, the third memory area, and the fourth memory area having a plurality of memory sub-areas having bits, words, and double words corresponding to information of type bit, word, and double word, respectively, wherein an element of each one of the plurality of memory sub-areas is defined by a rank,
   the standardized contents of the data structure formed by associating each one of the at least one logical channel with at least one of the plurality of objects; and
   a user program using an instruction set for exchanging the at least one of the plurality of objects with contents of the coupler memory.

5. An input/output system according to claim 4, wherein the processor memory includes an instance of the data structure associated with each one of the at least one input/output coupler.

6. An input/output system according to claim 5, wherein a syntax used to access information in the data structure includes an exchange type, an object type, and a topological address having a coupler address associated with a logical channel number and the rank.

7. An input/output system according to claim 6, wherein one of the at least one logical channel activates event controlled processing.

8. An input/output system according to claim 7, further comprising an instantiation mechanism for reserving a memory space for a language interface of the at least one logical channel.

* * * * *

UNITED STATES PATENT AND TRADEMARK OFFICE
CERTIFICATE OF CORRECTION

PATENT NO. : 5,923,903
DATED : July 13, 1999
INVENTOR(S) : Jorge ALVAREZ-ESCURRA, et al.

It is certified that error appears in the above-identified patent and that said Letters Patent is hereby corrected as shown below:

On the title page item [54] and on top of column 1, the title should be:

--[54] PROGRAMMABLE LOGIC CONTROLLER INPUT/OUTPUT SYSTEM--

Signed and Sealed this

Twenty-third Day of May, 2000

Attest:

Q. TODD DICKINSON

Attesting Officer

Director of Patents and Trademarks